(12) United States Patent
Fischer et al.

(10) Patent No.: US 10,710,418 B2
(45) Date of Patent: Jul. 14, 2020

(54) METHOD FOR WIRELESS OPTIMIZATION OF WHEEL MONITORING IN A VEHICLE, A WHEEL MONITORING SYSTEM OF A VEHICLE, AND ELECTRONIC WHEEL UNIT AND CONTROL DEVICE FOR A WHEEL MONITORING SYSTEM

(71) Applicant: Continental Automotive GmbH, Hannover (DE)

(72) Inventors: Frank Fischer, Regensburg (DE); Thomas Haas, Donaustauf (DE); Matthias Kretschmann, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/471,425

(22) PCT Filed: Dec. 19, 2017

(86) PCT No.: PCT/EP2017/083503
§ 371 (c)(1),
(2) Date: Jun. 19, 2019

(87) PCT Pub. No.: WO2018/114924
PCT Pub. Date: Jun. 28, 2018

(65) Prior Publication Data
US 2019/0329605 A1 Oct. 31, 2019

(30) Foreign Application Priority Data
Dec. 19, 2016 (DE) .......................... 10 2016 225 481

(51) Int. Cl.
*B60C 23/04* (2006.01)
*G06F 11/07* (2006.01)

(52) U.S. Cl.
CPC ........ *B60C 23/0437* (2013.01); *B60C 23/045* (2013.01); *B60C 23/0438* (2013.01); *G06F 11/076* (2013.01); *B60C 2200/04* (2013.01)

(58) Field of Classification Search
CPC .................................... B60C 1/00; H01Q 1/00
See application file for complete search history.

(56) References Cited

U.S. PATENT DOCUMENTS

| 6,972,672 B2 | 12/2005 | Desai |
| 7,253,726 B2 | 8/2007 | Okubo |

(Continued)

FOREIGN PATENT DOCUMENTS

| DE | 103 42 297 A1 | 4/2005 | |
| DE | 10342297 A1 * | 4/2005 | ......... B60C 23/0437 |

(Continued)

OTHER PUBLICATIONS

International Search Report and Written Opinion dated Apr. 6, 2018 from corresponding International Patent Application No. PCT/EP2017/083503.

*Primary Examiner* — Shirley Lu

(57) ABSTRACT

An aspect of the invention relates to a method for the radio-oriented optimization of wheel monitoring in a vehicle equipped with vehicle wheels, wherein the monitoring of at least one of the vehicle wheels is prompted by an electronic wheel unit arranged on the relevant vehicle wheel capturing at least one wheel operating parameter of the vehicle wheel, and radio signals containing information about the at least one captured wheel operating parameter being transmitted for a respective wheel rotational position of the vehicle wheel, stipulated by the electronic wheel unit, wherein the radio signals are received and evaluated by a control device of the vehicle and wherein the radio-oriented optimization of the wheel monitoring is prompted by the electronic wheel unit being used to transmit multiple radio signals for differ- (Continued)

Figure 1:
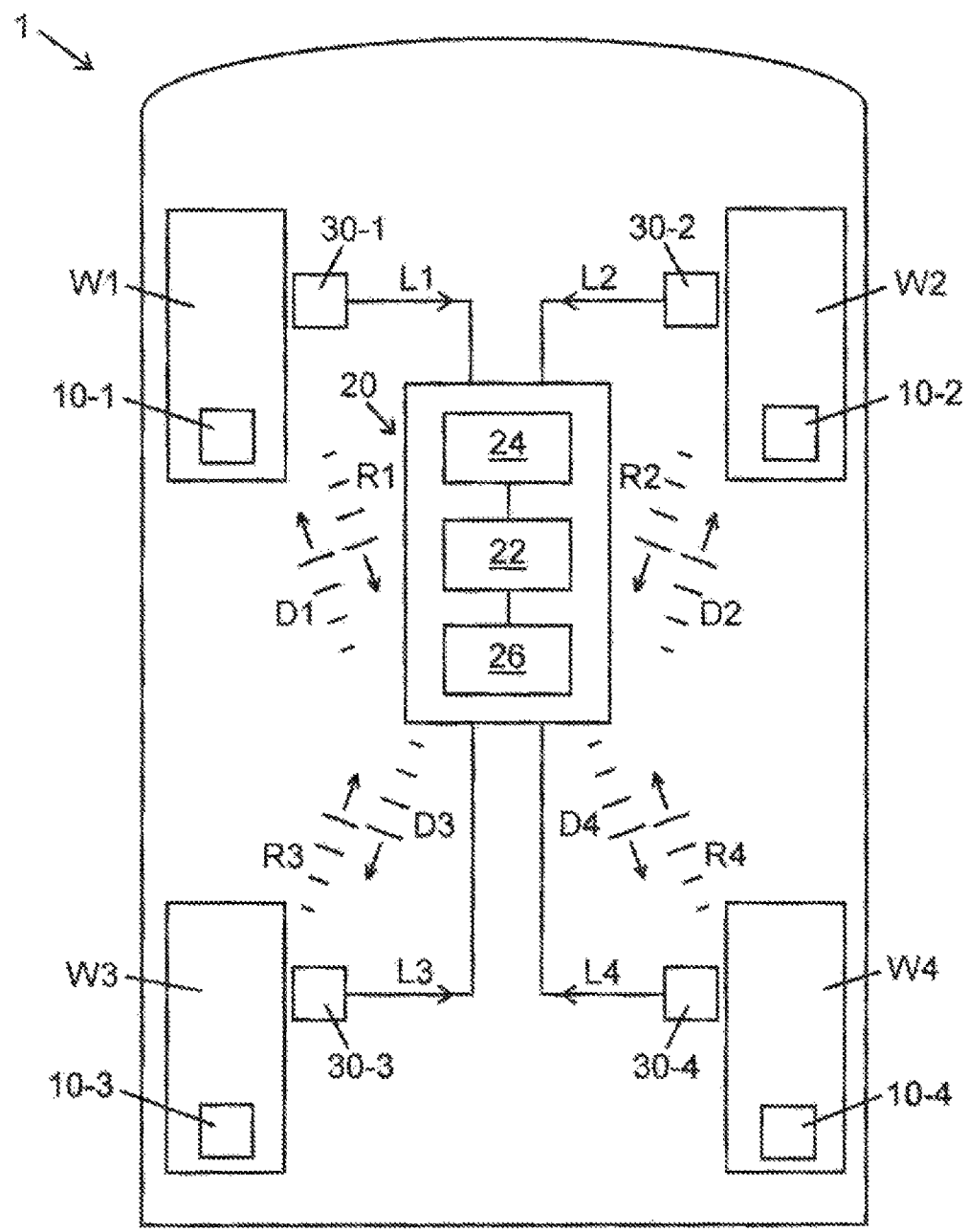

ent wheel rotational positions, wherein the radio signals are received by means of the control device and rated in respect of their respective radio signal strength, wherein the control device is used to transmit an optimization radio signal to the electronic wheel unit, wherein the optimization radio signal contains optimization information formed on the basis of the rating of the radio signals, and wherein the electronic wheel unit is used to receive the optimization radio signal, and the optimization information contained therein is taken into consideration for the stipulation of the wheel rotational position of the vehicle wheel for radio signals that are to be transmitted subsequently.

16 Claims, 3 Drawing Sheets

(56) References Cited

U.S. PATENT DOCUMENTS

| | | |
|---|---|---|
| 7,659,812 B2 | 2/2010 | Yegin et al. |
| 7,872,568 B2 | 1/2011 | Fink et al. |
| 2001/0008083 A1 | 7/2001 | Brown |
| 2002/0003474 A1 | 1/2002 | McClelland et al. |
| 2003/0001735 A1 | 1/2003 | Honeck et al. |
| 2003/0016126 A1 | 1/2003 | Katou |
| 2003/0107481 A1 | 6/2003 | Sawafuji |
| 2004/0090322 A1 | 5/2004 | Tsujita |
| 2004/0246117 A1 | 12/2004 | Ogawa et al. |
| 2009/0021363 A1 | 1/2009 | Heise et al. |
| 2012/0133498 A1* | 5/2012 | Nah ................ B60C 23/0416 340/447 |
| 2012/0166836 A1* | 6/2012 | Hardman ........ B60C 23/0433 713/320 |
| 2012/0259507 A1 | 10/2012 | Fink |
| 2016/0001614 A1 | 1/2016 | Kessler |

FOREIGN PATENT DOCUMENTS

| | | |
|---|---|---|
| DE | 60301378 T2 | 6/2006 |
| DE | 602004011425 T2 | 1/2009 |
| DE | 10 2009 059 788 A1 | 6/2011 |
| DE | 102010042198 A1 | 4/2012 |
| DE | 112010003247 T5 | 4/2013 |
| EP | 1270276 A2 | 1/2003 |
| EP | 1227018 B1 | 10/2005 |
| EP | 3132953 A1 | 2/2017 |
| ES | 2259977 T3 | 11/2006 |
| WO | 2015/008129 A1 | 1/2015 |

* cited by examiner of the wheel monitoring in a vehicle, a wheel monitoring system of a vehicle, and electronic wheel unit and control device for a wheel monitoring system The present invention relates to methods and systems for wheel monitoring, in particular for tire pressure monitoring, in a vehicle equipped with vehicle wheels and in this scenario specifically to radio-oriented optimization of the wheel monitoring.

In this respect, the invention relates to a method for the radio-oriented optimization of wheel monitoring, an electronic wheel unit for a wheel monitoring system, a control device for a wheel monitoring system, and a wheel monitoring system that has at least such an electronic wheel unit and such a control device.

Electronic wheel units, control devices and systems and methods for wheel monitoring produced thereby are known from DE 10 2009 059 788 A1, for example.

In such tire pressure monitoring systems, often also referred to as TPMSs, the electronic wheel units arranged on the vehicle wheels of the vehicle are each designed to measure, as a wheel operating parameter, at least one tire pressure of the relevant vehicle wheel formed from a rim and a tire mounted thereon.

During the monitoring mode, each electronic wheel unit from time to time sends radio signals to a control device arranged on the vehicle, these radio signals containing information about the previously measured tire pressure.

The control device of the vehicle is designed to receive and evaluate the radio signals of the electronic wheel units, so that e.g. in the event of an abnormality, for example an excessive loss of tire pressure, an appropriate abnormality signal can be generated and e.g. output to the driver of the vehicle as a warning.

As far as the transmission times of the radio signals transmitted by an electronic wheel unit for the wheel monitoring are concerned, the present invention thus assumes that the radio signals are transmitted for a respective wheel rotational position of the relevant vehicle wheel, stipulated by the electronic wheel unit.

This measure allows various advantages to be attained.

In particular, this measure can be used, for example, for what is known as localization, i.e. association—performed by the control device of the vehicle for the received radio signals—of the radio signal with a particular one of the multiple installed electronic wheel units, or association with an applicable installation position of the transmitting wheel unit. In the case of a conventional four-wheeled passenger vehicle, these are e.g. the positions "front left", "front right", "rear left" and "rear right". The association is based in this case on a comparison or an ascertainment of a correlation between wheel rotational positions and/or wheel rotation speeds that have been detected firstly by means of the electronic wheel units and secondly by means of a sensor system arranged firmly on the vehicle, e.g. wheel speed sensors of an anti-lock braking system (ABS).

The electronic wheel units should transmit the radio signals at as low a radio signal strength as possible in this case, e.g. in order to meet legal requirements, in order to produce little interfering radiation and in order to ensure a long life of the electronic wheel units, which are normally battery-operated.

On the other hand, the radio signal strength needs to be chosen to be high enough at the transmitter in order to ensure sufficiently good reception of the radio signals.

Against this background, the design of a vehicle that is to be equipped with a wheel monitoring system already gives rise to considerable development complexity for finding one or more installation positions for one or more radio reception units of the on-vehicle control device.

To make matters more difficult, the radio performance of the radio signal transmission in the later driving mode of the vehicle is also subject to certain variations. Influencing factors for the transmission quality can change dynamically while travelling, e.g. spring compression processes in the wheel suspensions, which influence the positions of the transmitters of the electronic wheel units in relation to the receiver, which is installed in stationary fashion relative to the vehicle bodywork, or vary for every beginning of a driving mode, such as e.g. spring compression states on the basis of a particular vehicle loading and number of passengers.

In this context, the aforementioned transmitting of the radio signals for a respective wheel rotational position stipulated by the electronic wheel unit is also of great significance, since, viewed in terms of radio, each vehicle wheel has firstly good wheel rotational positions, leading to a high radio signal strength at the location of the receiver, and secondly poor wheel rotational positions, leading to a low radio signal strength at the location of the receiver, through to what are known as black spots, for which reliable radio signal transmission is no longer guaranteed.

In U.S. Pat. No. 6,972,672 B1, such variations in the radio signal strength at the location of the receiver during wheel rotation are used for the aforementioned localization.

Further, in US 2016/0001614 A1, it is assumed that when the vehicle is at a standstill there is a certain likelihood of an electronic wheel unit being in a wheel rotational position that is poor for radio, in particular in a black spot wheel rotational position, and for this situation it is proposed that a bit rate transmitted via the radio connection be reduced in comparison with a bit rate of the radio data transmission when the vehicle is travelling.

It is an object of the present invention to provide radio-oriented optimization of wheel monitoring in a vehicle.

A first aspect of the invention relates to a method for the radio-oriented optimization of wheel monitoring in a vehicle equipped with vehicle wheels, wherein the monitoring of at least one of the vehicle wheels is prompted by an electronic wheel unit arranged on the relevant vehicle wheel capturing at least one wheel operating parameter of the vehicle wheel, and radio signals containing information about the at least one captured wheel operating parameter being transmitted for a respective wheel rotational position of the vehicle wheel, stipulated by the electronic wheel unit, wherein the radio signals are received and evaluated by a control device of the vehicle. The radio-oriented optimization of the wheel monitoring is prompted during operation of the vehicle by the electronic wheel unit being used to transmit multiple radio signals for different wheel rotational positions of the vehicle wheel, wherein the multiple radio signals are received by means of the control device and rated in respect of their respective radio signal strength, wherein the control device is used to transmit an optimization radio signal to the electronic wheel unit, wherein the optimization radio signal contains optimization information formed on the basis of the rating of the multiple radio signals, and wherein the electronic wheel unit is used to receive the optimization radio signal, and the optimization information contained therein is taken into consideration for the stipulation of the wheel rotational position of the vehicle wheel for radio signals that are subsequently to be transmitted.

The cited aspect of the invention can advantageously be used to produce an automatic improvement (optimization) in the performance of the radio transmission of the radio signals used for wheel monitoring systems by virtue of the wheel rotational position stipulated for transmitting the radio signals being dynamically adjusted. In particular, this allows the transmitting in the aforementioned black spot wheel rotational positions to be avoided in a simple manner. Further advantages of the invention are e.g. that a wheel monitoring system can be designed in less complicated fashion and radio signal strengths for which provision is to be made at the transmitter tend to be able to be reduced.

In one embodiment of the method, the electronic wheel unit and/or the control device is/are used to detect the beginning of a driving mode of the vehicle, and the radio-oriented optimization of the wheel monitored is triggered as a result of detection of the beginning of the driving mode.

Detection of the beginning of the driving mode by means of the control device of the vehicle can be accomplished e.g. based on an evaluation of sensor signals from wheel speed sensors arranged firmly on the vehicle that are able to be used to ascertain the wheel rotational positions and/or the wheel rotation speeds of the individual vehicle wheels and therefore a vehicle speed.

Detection of the beginning of the driving mode by means of the electronic wheel unit can be accomplished e.g. by virtue of the electronic wheel unit being equipped with an acceleration sensor for measuring acceleration, e.g. a radial acceleration, and the electronic wheel unit detecting the beginning of a driving mode by evaluating the sensor signal provided by the acceleration sensor.

In one embodiment, the control device is used to transmit a trigger radio signal to the electronic wheel unit in order to trigger the radio-oriented optimization of the wheel monitoring.

The trigger radio signal can be transmitted by the control device, e.g. when the beginning of a driving mode is detected by the control device. Alternatively or additionally, one or more other events, e.g. a trigger command input by a user, may also be defined that result in the trigger radio signal being transmitted.

In one embodiment, the wheel monitoring results in the control device being used to continuously rate the radio signal strength of the multiple received radio signals, and the steps for the radio-oriented optimization of the wheel monitoring are performed as soon as the radio signal strength no longer satisfies a threshold value criterion for correct operation, i.e. if the radio signal strength of at least one of the multiple received radio signals is below a predetermined threshold value. Also as a result of such an event, there can be provision for the aforementioned trigger radio signal to be transmitted from the control device to the electronic wheel unit.

In one embodiment, an instantaneous loaded state of the vehicle is also ascertained and the steps for the radio-oriented optimization of the wheel monitoring are performed if a change in the instantaneous loaded state of the vehicle is ascertained.

This is based on the consideration that a changed loaded state of the vehicle can cause a change in the good wheel rotational positions that lead to a high radio signal strength at the location of the receiver and/or in the poor wheel rotational positions that lead to a low radio signal strength at the location of the receiver. By way of example, a metal article recently loaded into the vehicle, e.g. a metal plate, can lead to a new black spot being formed.

In a further embodiment, the trigger radio signal transmitted by the control device contains addressing, e.g. one or more identification codes for identifying one or more electronic wheel units, in order to trigger the optimization specifically for one or more electronic wheel units according to the addressing.

In one embodiment, the radio-oriented optimization of the wheel monitoring is performed separately from the wheel monitoring by virtue of the multiple radio signals transmitted for the optimization by means of the electronic wheel unit being configured only for this purpose of optimization and containing no information about the at least one captured or monitored wheel operating parameter, but if need be being able to contain data that are useful in connection with the optimization.

In another embodiment, the radio-oriented optimization of the wheel monitoring is performed in a manner integrated in the wheel monitoring, to a certain extent as a partial functionality of the wheel monitoring, by virtue of the multiple radio signals transmitted for the optimization by means of the electronic wheel unit simultaneously being the radio signals required for performing the wheel monitoring, which contain information about the at least one captured wheel operating parameter.

As well as this, hybrid forms of the two aforementioned alternatives are also conceivable, namely for which only some of the radio signals transmitted for the optimization are simultaneously radio signals for the wheel monitoring.

In one embodiment, the rating of the multiple radio signals that is performed by means of the control device contains a measurement of the respective radio signal strength of the multiple radio signals, that is to say e.g. a measurement of a reception antenna signal strength, e.g. on a carrier frequency used for the radio signals.

Alternatively or additionally, the rating of the radio signal strength can be performed e.g. using a detection of a data error rate, i.e. the rating of the multiple radio signals by means of the control device can contain a detection of a data error rate.

To this end, it is possible to resort to a method for error detection and/or error correction. Such methods are typically based on the actual useful data that the radio signal contains additionally having redundant data added that allow erroneously transmitted useful data to be identified and corrected at the receiver.

The method for the radio-oriented optimization of the wheel monitoring involves the electronic wheel unit being used to transmit multiple radio signals for different wheel rotational positions in a first step.

Preferably, there are at least three radio signals, more preferably at least six radio signals, which are preferably all sent at the same radio signal strength at the transmitter.

The different wheel rotational positions for these radio signals can each be stipulated at any point in the 360° full circle (based on one wheel revolution).

In one embodiment, the wheel rotational positions are selected from a plurality of prescribed wheel rotational positions, e.g. from positions provided for in an angularly equidistant distribution over the 360° full circle, e.g. at intervals of 5°, 10° or 200°.

In one embodiment, the wheel rotational positions are stipulated in a random manner. Alternatively, a systematic stipulation is also possible, for example according to a prescribed scheme.

In one embodiment, the wheel rotational positions form a sequence of positions at angularly equidistant locations.

In one embodiment, at least one mutual interval between the wheel rotational positions of directly successive radio signals is less than 360°. The accordingly relatively quick succession of the radio signals advantageously minimizes distortions in the optimization result, e.g. on the basis of gradually changing radio circumstances.

In one preferred embodiment, the wheel rotational positions are all in an angle range extending over no more than two wheel revolutions, i.e. 720°, more preferably in an angle range extending over no more than one wheel revolution, i.e. 360°.

In a more specific embodiment, there is provision for the optimization to be prompted by n radio signals being transmitted for n different wheel rotational positions, wherein mutual intervals between successive radio signals are 360°/n, for example 36 radio signals at a respective interval of 10°.

Information about the wheel rotational positions used for the radio-oriented optimization can be stored in the electronic wheel unit at least temporarily, e.g. until the conclusion of the optimization. This is sometimes even necessary, namely when e.g. the specific type of optimization information returned means that the electronic wheel unit needs this information in order to conclude the optimization process. A pertinent example: If the optimization information returned by the control device indicates that radio signal No 3 was optimum, then the electronic wheel unit sometimes needs to know the wheel rotational position within the 360° full circle at which radio signal No 3 was previously transmitted.

Alternatively or additionally, such information about the wheel rotational positions used can also be included in the radio signals as well, e.g. in a manner coded as data. In this case, the optimization information returned by the control device could refer e.g. to these details, such as e.g. "The radio signal transmitted for the wheel rotational position of 35° was optimum" (alternatively or additionally e.g.: "The radio signal transmitted for the wheel rotational position of 175° was particularly poor").

Knowledge of the individual wheel rotational positions used that is adequate for the on-vehicle control device within the context of the invention can also be accomplished e.g. by virtue of a synchronized time measurement being performed in the control device and in the electronic wheel unit, so that the control device is provided with information about the relevant wheel rotational position just on the basis of the time of reception of a radio signal, which substantially corresponds to the time of transmission of this radio signal. In this case, the optimization information returned by the control device could yield e.g. time-based details, such as e.g. "The radio signal transmitted 3.1 seconds ago was optimum; the radio signal transmitted 0.9 second ago was poorest".

In this context, it should be noted that the presence of a common time base in the control unit and the electronic wheel unit can result in every determined wheel rotational position, for the present application, also being able to be represented by the indication of a time as an alternative to the indication of an angle.

At any rate, the returned optimization radio signal is used to transmit information to the electronic wheel unit on the basis of which, with or without resorting to information temporarily stored in the electronic wheel unit, the electronic wheel unit can determine the optimized wheel rotational position stipulations for radio signals that are subsequently to be transmitted for the wheel monitoring.

Within the context of the present application, the term "radio-oriented optimization" is intended to mean that it attempts or manages to at least start to improve the radio signal strength at the location of the on-vehicle reception device of the control device, even without increasing the radio signal strength at the transmitter, by adapting that wheel rotational position or those wheel rotational positions that are stipulated for radio signals that are subsequently to be transmitted.

Evaluation of the optimization radio signal can result, as a matter of general principle, in one or more properties used for information transmission being taken into consideration, in particular a time of the beginning of the optimization radio signal; a time of the end of the optimization radio signal; one or more time differences detectable in the radio signal; a content, in particular e.g. a digitally coded content, or data contained.

As an alternative or in addition to information about the wheel rotational position used as data content of a relevant radio signal, other data can also be contained in the radio signals in coded fashion, in particular e.g. a respective identification code of the relevant electronic wheel unit and/or an identifier identifying the radio signal as a radio signal transmitted for the optimization, and/or e.g. a radio signal number or another ordinal quantity allocated e.g. continuously for the individual radio signals transmitted for the optimization.

In a second step of the radio-oriented optimization, the radio signals are received by means of the control device and rated in respect of their respective radio signal strengths.

As already explained, this can prompt there to be provision for in particular a direct measurement of the radio signal strengths or e.g. an indirect measurement on the basis of a measured data error rate. An important feature for the manner of the rating is ultimately capturing and quantifying a parameter denoting a measure of the radio-oriented transmission quality.

In a third step of the optimization, the control device is used to transmit to the electronic wheel unit an optimization radio signal that contains optimization information formed on the basis of the rating of the multiple radio signals.

There are a wide variety of options for the manner of the formation or the specific content of the optimization information, reference also being made in this regard to the explanations already provided above.

One option is e.g. to include the rating result as such for each radio signal in the optimization information as well, that is to say e.g. quantitative measures of the respectively received radio signal strength and/or of the respective data error rate.

Another option is to include the rating result in summarized or simplified form in the optimization information as well, e.g. by using a classification for the detected radio signal strength of each radio signal, such as e.g. "good", "average", "poor".

Even more concisely, the optimization information can e.g. merely indicate that or those radio signals for which high or maximum radio signal strengths have been detected and/or that or those radio signals for which low or minimum radio signal strengths have been detected (e.g. "highest radio signal strengths for radio signals Nos 2, 3 and 4; lowest radio signal strengths for radio signals Nos 15, 16 and 17").

Finally, the optimization information or the optimization radio signal containing this information should expediently contain addressing, e.g. an identification code of the relevant electronic wheel unit, in order to address the optimization information to the correct wheel unit when there are multiple electronic wheel units installed on the vehicle.

In a fourth step of the optimization, the electronic wheel unit is finally used to receive the optimization radio signal, and the optimization information contained therein is taken into consideration for the stipulation or the stipulations of the wheel rotational position of the relevant vehicle wheel for radio signals that are subsequently to be transmitted for the wheel monitoring.

In this case, e.g. a rating result that the optimization information contains can be taken as an opportunity for the relevant electronic wheel unit to exclude one or more wheel rotational positions having a poor rating result from the subsequent stipulations of the wheel rotational position and/or to prioritize one or more wheel rotational positions having a good rating result for the subsequent stipulations, that is to say in particular to e.g. subsequently transmit radio signals for the wheel monitoring only for one or more of these wheel rotational positions that are rated as good or best.

As an alternative to the variant explained above, of merely including a rating result in the optimization information as well in the third step and performing a corresponding measure, e.g. exclusion and/or prioritization of wheel rotational positions, in the fourth step, the latter definition of the measure could also be provided by the on-vehicle control device right in the third step and included in the optimization information as well as a control command for the relevant wheel unit.

The method for wheel monitoring, which is improved by radio-oriented optimization, can in particular be employed e.g. for a passenger vehicle, in particular a four-wheeled passenger vehicle, or a truck, and include at least tire pressure monitoring, for example.

As an alternative or in addition to tire pressure, other wheel operating parameters can also be monitored, such as e.g. a tire temperature. Alternatively or additionally, the wheel operating parameter captured can e.g. also be a wheel rotational position and/or a wheel rotation speed of the relevant vehicle wheel, and the radio signals can be used to transmit appropriate information about this to the control device of the vehicle.

The radio signals transmitted for wheel monitoring are preferably digitally coded signals, e.g. radio data messages. The same applies, mutatis mutandis, to the radio signals transmitted for the radio-oriented optimization and also to the aforementioned trigger radio signal.

The radio signals or radio data messages transmitted for the wheel monitoring can from time to time be transmitted according to a transmission strategy and can in particular e.g. also contain wheel information in addition to the information about the at least one captured wheel operating parameter. Such information, e.g. relating to a rim and/or relating to a tire mounted thereon, can be stored in the electronic wheel unit e.g. by workshop personnel when or after wheels or tires are newly fitted or refitted. The transmission of such information, e.g. at least once after the beginning of a journey by the vehicle, to the control device of the vehicle has e.g. the advantage that it means that safety and/or comfort functions of the vehicle, such as e.g. ABS, ESP, etc., can be adjusted in optimized fashion by means of adaptation to the wheel equipment of the vehicle.

The electronic wheel unit can be e.g. battery operated and can be fixed, e.g. in the case of a vehicle wheel formed from a rim and a tire mounted thereon, on the rim or on a valve shaft or on the tire, e.g. on an inner side of a tire tread surface of the tire.

The electronic wheel unit can have, for detecting the at least one wheel operating parameter, at least one sensor for measuring the wheel operating parameter or parameters.

Preferably, the electronic wheel unit has a program-controlled computer unit having an associated memory unit, e.g. in order to subject sensor signals of one or more sensors to further processing and/or evaluation, and in order to produce the information to be transmitted to the control device of the vehicle by means of the radio signals, e.g. in the form of data messages with digitally coded information. A program code controlling the operation of the computer unit and also further data can be stored in the memory unit.

Further data stored in the memory unit of the electronic wheel unit can contain, in particular, wheel data. These can be understood to be quite generally physical properties measurable at the relevant vehicle wheel, e.g. tire dimensions such as tire diameter, etc., and other properties of the relevant vehicle wheel, e.g. manufacturer, tire type, DOT code, etc., which are substantially dependent only on the qualities of the wheel itself and/or do not depend directly on the current operation of the vehicle wheel. Such wheel data can be stored in the relevant electronic wheel unit e.g. by workshop personnel during a wheel change or tire change.

Additionally, the memory unit of the electric wheel unit can be used to store the wheel rotational position found by means of the radio-oriented optimization and to be stipulated for radio signals that are subsequently to be transmitted. After every further performance of such radio-oriented optimization, the stored wheel rotational position can be e.g. overwritten and hence updated.

Finally, the electronic wheel unit has for example a radio transmission and reception device for transmitting the radio signals for the wheel monitoring and/or the radio-oriented optimization and for receiving the optimization radio signal.

The control device preferably has a program-controlled computer unit having an associated memory unit. A program code controlling the operation of the computer unit and also further data, such as in particular e.g. the wheel data transmitted by the electronic wheel unit e.g. whenever a journey begins, can be stored in the memory unit.

Further, the control device has for example a radio transmission and reception device for receiving the radio signals from the electronic wheel unit for the wheel monitoring and/or the radio-oriented optimization and for transmitting optimization radio signals to the electronic wheel unit.

Preferably, the control device is further designed to use, for the wheel monitoring of multiple vehicle wheels, identification codes transmitted by each of the electronic wheel units to the control device using the radio signals and identifying each of the electronic wheel units, in order to use these identification codes to make an association between the individual received radio signals, or the data contained therein, and a respective installation position of the relevant vehicle wheel, this also being referred to as localization.

The association being made in this case between the identification codes and the installation positions (such as e.g. "front left", "front right", "rear left" and "rear right") can be based e.g. in particular on a comparison or an ascertainment and evaluation of a correlation between wheel rotational positions and/or wheel rotation speeds that have been detected by means of the electronic wheel units and also by means of a sensor system arranged firmly on the vehicle, e.g. by means of wheel speed sensors.

A wheel monitoring system formed by means of at least one electronic wheel unit of the type described here and/or a control device of the type described here can have in particular at least the functionality of tire-pressure monitoring and can therefore form a tire pressure monitoring system (TPMS).

As an alternative or in addition to the detection of the tire pressure at the relevant vehicle wheel, it is, however, also possible for other wheel operating parameters of the vehicle wheel to be captured and used to generate the corresponding radio signals, such as e.g. a tire temperature and/or an acceleration at the location at which the electronic wheel unit is arranged.

By means of the detection of an acceleration, in particular e.g. a radial acceleration, an instantaneous rotational position and/or an instantaneous rotation speed of the relevant vehicle wheel can advantageously also be determined by appropriate evaluation of the sensor signal. The rotational position and/or the rotation speed can then be taken into consideration e.g. as further captured wheel operating parameters for the formation of the radio signals. A rotational position detected in this manner for the vehicle wheel can be used in particular to accomplish the transmitting of the individual radio signals for a respectively stipulated wheel rotational position.

The term "wheel operating parameter" comprises generally any physical variable that is measurable at the relevant vehicle wheel and can be changed in accordance with a driving mode, e.g. the tire pressure, the tire temperature, a rotation speed, etc.

The radio signals transmitted for the wheel monitoring contain information about the relevant wheel operating parameter or parameters, e.g. tire pressure measured values, tire temperature measured values, rotation speed measured values, etc., and possibly also about at least one variable derived therefrom, such as e.g. a tire pressure corrected for a prescribed temperature.

In addition to the transmission of such information relating to the wheel operation to the control device, it is also possible to provide for the aforementioned wheel data to be transmitted to the control device by means of the radio signals.

A second aspect of the invention relates to an electronic wheel unit for a wheel monitoring system of a vehicle equipped with vehicle wheels, wherein the electronic wheel unit is designed to capture, while being arranged on one of the vehicle wheels, at least one wheel operating parameter of the vehicle wheel and to transmit radio signals containing information about the at least one captured wheel operating parameter to a control device, designed for receiving and evaluating the radio signals, of the vehicle for a respective wheel rotational position of the vehicle wheel, stipulated by the electronic wheel unit. The electronic wheel unit is further designed to prompt radio-oriented optimization of the wheel monitoring by transmitting multiple radio signals for different wheel rotational positions of the vehicle wheel and receiving an optimization radio signal then transmitted by the control device and taking into consideration optimization information contained in said optimization radio signal for the stipulation of the wheel rotational position of the vehicle wheel for radio signals that are subsequently to be transmitted.

The electronic wheel unit can in particular be designed to detect the beginning of a driving mode of the vehicle and to trigger the radio-oriented optimization of the wheel monitoring as a result of detection of the beginning of the driving mode.

A third aspect of the invention relates to a control device for a wheel monitoring system of a vehicle equipped with vehicle wheels, wherein at least one of the vehicle wheels is equipped with an electronic wheel unit, arranged thereon, for capturing at least one wheel operating parameter of the respective vehicle wheel and for transmitting radio signals, which contain information about the at least one captured wheel operating parameter, to the control device for a respective wheel rotational position of the vehicle wheel, stipulated by the electronic wheel unit, and wherein the control device is designed to receive and evaluate the radio signals. The control device is further designed to prompt radio-oriented optimization of the wheel monitoring by receiving multiple radio signals from the electronic wheel unit and rating them in respect of their respective radio signal strength and then transmitting an optimization radio signal to the electronic wheel unit, wherein the optimization radio signal contains optimization information formed on the basis of the rating of the multiple radio signals.

The control device can in particular be designed to detect the beginning of a driving mode of the vehicle and to trigger the radio-oriented optimization of the wheel monitoring as a result of detection of the beginning of the driving mode.

The control device can also be designed to transmit a trigger radio signal to the electronic wheel unit in order to trigger the radio-oriented optimization of the wheel monitoring.

The control device can further be designed to continuously rate the radio signal strength of the multiple received radio signals and to perform the radio-oriented optimization of the wheel monitoring as soon as the radio signal strength of at least one of the multiple received radio signals is below a predetermined threshold value.

As well as this, the control device can be designed to also ascertain an instantaneous loaded state of the vehicle and to perform the radio-oriented optimization of the wheel monitoring if a change in the instantaneous loaded state of the vehicle is ascertained.

Embodiments and particular refinements of the optimization method and of the underlying wheel monitoring method can be provided for in a corresponding manner as embodiments and particular refinements of the electronic wheel unit or of the control device, and vice versa.

A further aspect of the invention relates to a computer program product having a program code that, when executed on a data processing device (e.g. a data processing device of the control device and/or a data processing device of the electronic wheel unit), carries out a method for the radio-oriented optimization of wheel monitoring of the type described here.

Figure 2:
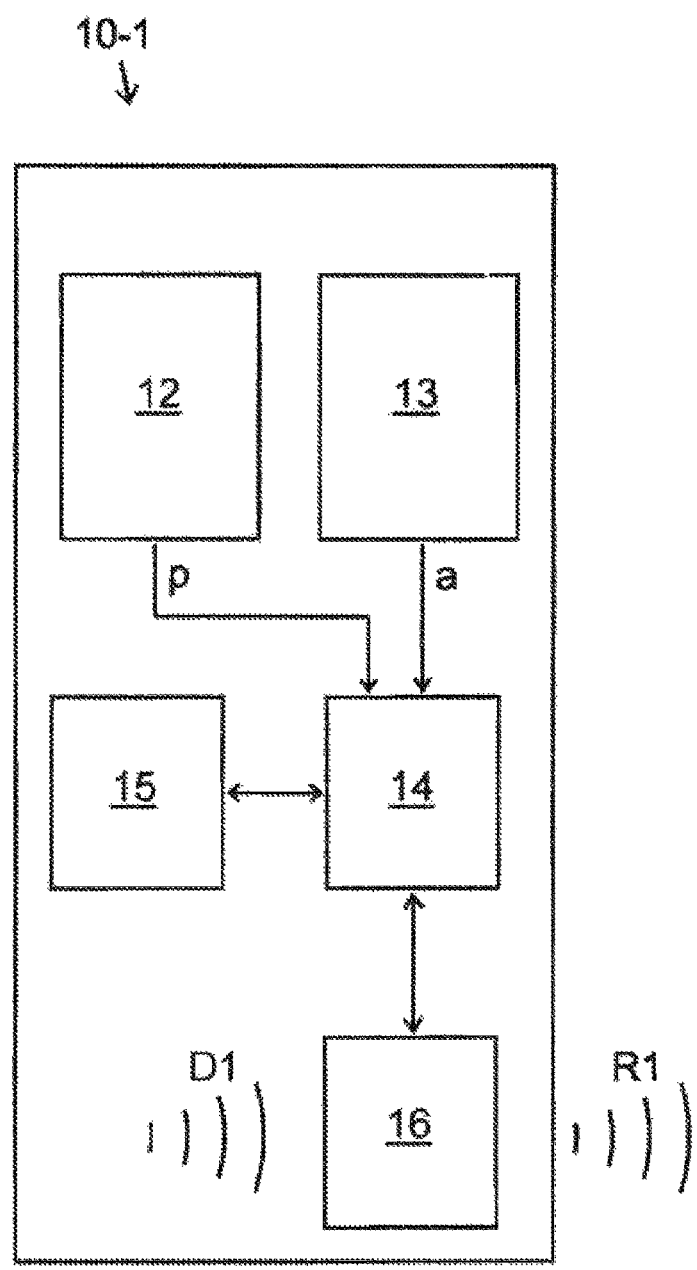
Figure 3:
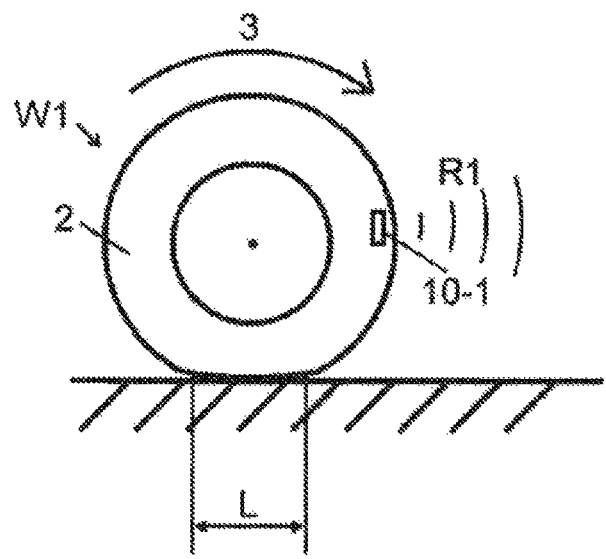
Figure 4:
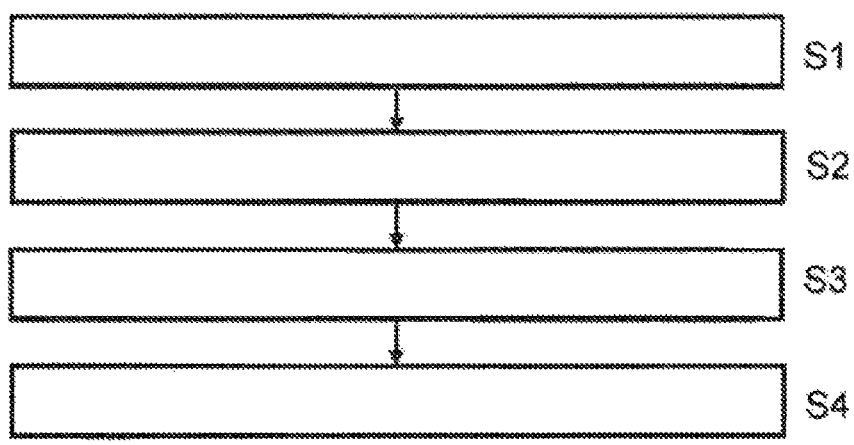

The invention is described in more detail below on the basis of exemplary embodiments with reference to the enclosed drawings, in which:

FIG. 1 shows a schematic plan view of a vehicle according to one exemplary embodiment, which is equipped with a wheel monitoring system, FIG. 2 shows a block diagram of an electronic wheel unit used in the wheel monitoring system of FIG. 1, FIG. 3 shows a schematic side view of the vehicle wheel equipped with the electronic wheel unit of FIG. 2, and FIG. 4 shows a flowchart for a method, performed by the wheel monitoring system, for the radio-oriented optimization of the wheel monitoring.

FIG. 1 shows a vehicle 1, in this case in exemplary fashion a four-wheeled passenger vehicle having vehicle wheels W1-W4.

Each vehicle wheel W1-W4 is equipped with an electronic wheel unit 10-1, 10-2, 10-3 or 10-4, arranged thereon, for capturing at least one wheel operating parameter of the respective vehicle wheel W1, W2, W3 or W4 and for transmitting corresponding radio signals R1, R2, R3 and R4 to a control device 20 of the vehicle 1.

The radio signals R1-R4 are transmitted e.g. according to a predetermined data transmission protocol and according to a transmission strategy stipulating the transmission times. The individual radio signals R1-R4 are sent in this case for a respective wheel rotational position stipulated by the relevant electronic wheel unit, there being provision for e.g. a respective single wheel rotational position for each of the radio signals R1-R4 or else there being provision for multiple different wheel rotational positions, from which one specific wheel rotational position is selected for each individual transmission.

In the example depicted, a tire pressure monitoring system (TPMS) of the vehicle 1 is formed by means of the electronic wheel units 10-1 to 10-4.

Accordingly, the electronic wheel units 10-1 to 10-4 each detect at least the tire pressure of the relevant vehicle wheel W1-W4, the vehicle wheels W1-W4 in this example each being formed by a rim with an air-filled tire mounted thereon, and the electronic wheel units 10-1 to 10-4 use the radio signals R1-R4 to transmit digitally coded wheel operating data, containing at least information about the tire pressure, to the control device 20 of the vehicle 1.

The electronic wheel units 10-1 to 10-4 have, in the embodiment shown, an identical design and can be arranged e.g. on an inner side of a tire tread surface of the respective tire.

FIG. 2 shows in exemplary fashion the design of the electronic wheel unit 10-1 arranged on the vehicle wheel W1. Said electronic wheel unit contains, as does each of the other wheel units 10-2 to 10-4, a pressure sensor 12 for measuring the tire pressure and for providing a sensor signal "p" representing the tire pressure and an acceleration sensor 13 for measuring a radial acceleration at the location at which the electronic wheel unit 10-1 is mounted and for providing a sensor signal "a" representing this radial acceleration.

The sensor signals "p" and "a" are, as depicted in FIG. 2, supplied for processing to a program-controlled computer unit 14, the operation of which is controlled by a program code stored in an associated digital memory unit 15.

The computer unit 14 generates the wheel operating data that are to be transmitted in the form of the radio signals R1 by radio, said wheel operating data being transmitted from time to time to the on-vehicle control device 20 shown in FIG. 1.

The measurement of the radial acceleration and provision of the corresponding sensor signal "a" serves in the depicted example to ascertain, on the basis of an evaluation of the sensor signal profile performed by the computer unit 14, values of an instantaneous wheel rotational position and/or wheel rotation speed of the relevant vehicle wheel W1 and to include corresponding information about this in the radio signals R1.

The electronic wheel unit 10-1 is, also, equipped with a radio transceiver unit 16 that is used to transmit the radio signals R1.

FIG. 3 illustrates in exemplary fashion an arrangement of the electronic wheel unit 10-1 on an inner side of a tire tread surface of a tire 2 of the vehicle wheel W1. The rotational movement of the vehicle wheel W1 while the vehicle 1 is travelling is symbolized in FIG. 3 by an arrow 3.

The acceleration sensor 13 (FIG. 2) integrated in the electronic wheel unit 10-1 is used, e.g. in the event of detection of a radio acceleration while travelling, to detect a sensor signal "a" having an approximately sinusoidal profile according to the varying gravitational component of the acceleration, said sinusoidal profile having an offset conditional upon the centrifugal force. Both the period of the sinusoidal profile and the offset are dependent in this case on the wheel rotation speed and hence the vehicle speed.

Evaluation of the sensor signal "a" allows both the instantaneous wheel rotational position and the instantaneous wheel rotation speed of the vehicle wheel W1 to be ascertained in a simple manner.

Alternatively or additionally, this ascertainment can be prompted by using the circumstance indicated in FIG. 3 that the tire 2 is somewhat deformed on its tire contact surface L, so that during the rotation of the vehicle wheel W1 certain signal characteristics in the sensor signal profile occur in particular when the electronic wheel unit 10-1 enters the area of the tire contact surface and when the electronic wheel unit 10-1 leaves this area again.

The occurrence of these signal characteristics therefore marks a respective wheel rotational position in which the electronic wheel unit 10-1 is right at the bottom of the vehicle wheel W1 close to the driving surface, which can be defined e.g. as a wheel rotational position of 00 (or e.g. 180°), and the interval of time between a successive occurrence of the signal characteristics is representative of the instantaneous wheel rotation speed.

Returning to FIG. 1, the control device 20 of the vehicle 1 is also equipped with a radio transceiver unit 26 that is used to receive the radio signals R1-R4 of the electronic wheel units 10-1 to 10-4.

In addition, the on-vehicle control device 20 has a program-controlled computer unit 22 for evaluating the wheel operating data contained in the radio signals R1-R4, wherein the operation of the computer unit 22 is controlled by a program code stored in an associated digital memory unit 24.

In the example depicted, the electronic wheel units 10-1 to 10-4 in conjunction with the control device 20 form the tire pressure monitoring system of the vehicle 1.

In the event of a loss of tire pressure being detected at one of the vehicle wheels W1-W4 by the control device 20 on the basis of the received tire pressure data, the control device 20 can provide a corresponding abnormality message, in particular e.g. a warning to the driver of the vehicle 1, e.g. via a human-machine interface of the vehicle 1.

During this wheel monitoring, the control device 20 also performs what is known as localization, i.e. association, performed for the received radio signals R1-R4, with one of the four installation positions "front left", "front right", "rear left" and "rear right" in the embodiment shown.

A fundamental feature of this localization in the example depicted is firstly that each radio signal R1-R4 also contains an identification code uniquely identifying the respective transmitting electronic wheel unit 10-1, 10-2, 10-3 or 10-4, so that the radio signals R1-R4 coming from different electronic wheel units can thus be distinguished from one another. Secondly, the actual association with the cited installation positions is prompted by the control device 20 ascertaining and evaluating correlations between wheel rotational positions and/or wheel rotation speeds that have been detected by the electronic wheel units 10-1 to 10-4 and e.g. are identifiable on the basis of the transmission times and/or the data content of the radio signals R1-R4, and have also been detected by means of wheel speed sensors 30-1 to 30-4 arranged firmly on the vehicle. The latter wheel rotational positions and wheel rotation speeds are transmitted to the control device 20, e.g. via a digital communication bus system, such as e.g. a CAN bus or the like, as line-based wheel speed sensor signals L1 to L4.

The special feature of the invention that is described below on the basis of the depicted exemplary embodiment relates to a method for the radio-oriented optimization of the wheel monitoring or to the special refinement of the control device 20 and of the electronic wheel units 10-1 to 10-4 that is provided for this purpose.

In the example depicted, the radio-oriented optimization can be triggered e.g. by the control device 20, under the control of the program code stored in the memory unit 24, e.g. in particular if it is established that the radio-oriented quality of the data transmission for at least one of the electronic wheel units 10-1 to 10-4 drops below a prescribed threshold.

This can be established e.g. by means of a direct measurement of the radio signal strength of the radio signals R1-R4 at the receiver and/or on the basis of quantitative detection of data errors in the radio signals R1-R4.

It is assumed that this case arises for the radio signals R2 transmitted for the wheel monitoring, which are transmitted by the electronic wheel unit 10-2 arranged on the vehicle wheel W2.

The control device 20 then uses the radio transceiver unit 26 to transmit a trigger radio signal addressed to the electronic wheel unit 10-2 in order to trigger the radio-oriented optimization of the wheel monitoring for the vehicle wheel W2.

The electronic wheel unit 10-2 is then used to transmit multiple radio signals to the on-vehicle control device 20 by means of the radio transceiver unit 16 of the electronic wheel unit 10-2 e.g. in relatively brief temporal succession, specifically for different wheel rotational positions of the vehicle wheel W2, as established by the electronic wheel unit 10-2.

These radio signals sent for the optimization preferably contain an identification code of the relevant electronic wheel unit, in this case the wheel unit 10-2, and e.g. contain no wheel operating parameter data or fewer wheel operating data than the radio signals R2 transmitted for the monitoring.

By way of example, 36 such radio signals are transmitted for wheel rotational positions provided for in a manner evenly distributed over a full 360° revolution of the vehicle wheel W2, that is to say with an angular spacing of in each case 10° between directly successive radio signals.

Based on reception and respective ascertainment and rating of the radio signal strengths by the control device 20, the latter forms optimization information that can represent a result of said rating, e.g. in digitally coded form, and uses the radio transceiver unit 26 to transmit an optimization radio signal D2 containing the optimization information back to the electronic wheel unit 10-2.

The optimization information can e.g. indicate the result of a quantitative rating of the radio signal strengths of all 36 radio signals, the optimization radio signal D2 preferably additionally containing the identification code of the electronic wheel unit 10-2, so that the optimization radio signal D2 is addressed specifically to the relevant electronic wheel unit, in this case the wheel unit 10-2.

Applicable optimization radio signals D1, D3 and D4 can be transmitted to the appropriate wheel unit 10-1, 10-3 or 10-4 for radio-oriented optimization of the wheel monitoring for the vehicle wheels W1, W3 and W4.

The electronic wheel unit 10-2 receives the optimization radio signal D2 and takes into consideration the optimization information contained therein for the stipulation of the wheel rotational position for radio signals R2 that are to be subsequently transmitted for the wheel monitoring.

The consideration can e.g. involve the e.g. 10 poorest wheel rotational positions with a poorly rated radio signal strength being excluded from the future stipulations and/or the e.g. 10 best wheel rotational positions with a good or the best rated radio signal strength being prioritized for the future stipulations.

It goes without saying that there are a wide variety of options in this regard for the consideration.

By way of example, there could also be provision for the stipulations of the wheel rotational position for radio signals R2 that are subsequently to be transmitted to be constantly limited to that single wheel rotational position for which the radio signal strength has been rated as best.

The thus completed adjustment of the future transmission strategy for the stipulations of the wheel rotational position is at least temporarily stored by the electronic wheel unit 10-2, e.g. in the memory unit 15, and is overwritten as soon as the optimization method for the wheel unit 10-2 is performed again at a later time.

The triggering of the optimization method by the control device 20 of the vehicle 1 has the advantage that it is a simple matter for timing coordination to be effected in the event of optimizations for multiple instances of the in this case e.g. total of four electronic wheel units 10-1 to 10-4 present being intended to be performed more or less simultaneously.

In this case, under the control of the program code stored in the memory unit 24, the control device 20 can manage, i.e. execute, the multiple optimizations to be performed in succession, so as to avoid radio signal collisions.

As a departure from this exemplary embodiment, there could alternatively or additionally also be provision for triggerability of the radio-oriented optimization by the electronic wheel units 10-1 to 10-4, but in the event of such triggering the optimization of the relevant electronic wheel unit is preferably not begun immediately, but rather a request radio signal transmitted by the electronic wheel unit is preferably initially used to request the optimization from the control device 20 in this case, and only then does the control device 20 transmit a trigger radio signal of the type already mentioned to the relevant electronic wheel unit in order to actually trigger the optimization. This allows the control device 20, in the event of substantially simultaneous reception of multiple request radio signals, to perform timing coordination for the multiple optimizations to be performed, in order to avoid radio signal collisions.

FIG. 4 once again illustrates the essential steps of the optimization method that are carried out in the example described.

In a step S1, the relevant electronic wheel unit is used to transmit multiple radio signals with or without wheel operating data for stipulated, different wheel rotational positions.

In a step S2, these radio signals are received by means of the control device and rated in respect of their respective radio signal strengths.

In a step S3, the control device is used to transmit an optimization radio signal that contains optimization information formed on the basis of the rating of the multiple radio signals.

In a step S4, the electronic wheel unit is finally used to receive the optimization radio signal, and the optimization information contained therein is taken into consideration for the stipulation of the wheel rotational position for radio signals that are subsequently to be transmitted for the wheel monitoring.

LIST OF REFERENCE SIGNS

1 Vehicle
2 Tire
3 Arrow
W1 to W4 Vehicle wheels
10-1 to 10-4 Wheel units
R1 to R4 Radio signals
12 Pressure sensor
p Sensor signal
13 Acceleration sensor
a Sensor signal
14 Computer unit
15 Memory unit
16 Radio transceiver unit
20 Control device
22 Computer unit
24 Memory unit
26 Radio transceiver unit
30-1 to 30-4 Wheel speed sensors
L1 to L4 Wheel speed sensor signals
D1 to D4 Optimization radio signals
L Tire contact surface
S1 Step
S2 Step
S3 Step
S4 Step

The invention claimed is:

1. A method for a radio-oriented optimization of wheel monitoring in a vehicle equipped with vehicle wheels, wherein the monitoring of at least one of the vehicle wheels is prompted by an electronic wheel unit arranged on a relevant vehicle wheel capturing at least one wheel operating parameter of the vehicle wheel, and radio signals containing information about the at least one captured wheel operating parameter being transmitted for a respective wheel rotational position of the vehicle wheel, stipulated by the electronic wheel unit, wherein the radio signals are received and evaluated by a control device of the vehicle,
  wherein the radio-oriented optimization of the wheel monitoring is prompted during operation of the vehicle by the electronic wheel unit being used to transmit multiple radio signals for different wheel rotational positions of the vehicle wheel, wherein the multiple radio signals are received by the control device and rated in respect of their respective radio signal strength, wherein the control device is used to transmit an optimization radio signal to the electronic wheel unit, wherein the optimization radio signal comprises optimization information formed on the basis of rating of the multiple radio signals, and wherein the electronic wheel unit is used to receive the optimization radio signal, and the optimization information contained therein is taken into consideration for the stipulation of the wheel rotational position of the vehicle wheel for radio signals that are subsequently to be transmitted.

2. The method as claimed in claim 1, wherein at least one of the electronic wheel unit and the control device is used to detect beginning of a driving mode of the vehicle, and the radio-oriented optimization of the wheel monitoring is triggered in response to detection of the beginning of the driving mode.

3. The method as claimed in claim 1, wherein the control device is used to transmit a trigger radio signal to the electronic wheel unit in order to trigger the radio-oriented optimization of the wheel monitoring.

4. The method as claimed in claim 1, wherein the wheel monitoring comprises the control device being used to continuously rate the radio signal strength of the multiple received radio signals and wherein the steps for the radio-oriented optimization of the wheel monitoring are performed as soon as the radio signal strength of at least one of the multiple received radio signals is below a predetermined threshold value.

5. The method as claimed in claim 1, wherein an instantaneous loaded state of the vehicle is also ascertained and wherein the steps for the radio-oriented optimization of the wheel monitoring are performed if a change in the instantaneous loaded state of the vehicle is ascertained.

6. The method as claimed in claim 1, wherein the rating of the multiple radio signals by the control device comprises a measurement of the respective radio signal strength of the multiple radio signals.

7. The method as claimed in claim 1, wherein the rating of the multiple radio signals by the control device comprises a detection of a data error rate.

8. An electronic wheel unit for a wheel monitoring system of a vehicle equipped with vehicle wheels, wherein the electronic wheel unit is configured to capture, while being arranged on one of the vehicle wheels, at least one wheel operating parameter of the vehicle wheel and to transmit radio signals containing information about the at least one captured wheel operating parameter to a control device, configured to receive and evaluate the radio signals, of the vehicle for a respective wheel rotational position of the vehicle wheel, stipulated by the electronic wheel unit,
  wherein the electronic wheel unit is further configured to prompt radio-oriented optimization of the wheel monitoring by transmitting multiple radio signals for different wheel rotational positions of the vehicle wheel and receiving an optimization radio signal then transmitted by the control device and taking into consideration optimization information contained in said optimization radio signal for the stipulation of the wheel rotational position of the vehicle wheel for radio signals that are subsequently to be transmitted.

9. The electronic wheel unit as claimed in claim 8, wherein the electronic wheel unit is configured to detect beginning of a driving mode of the vehicle and to trigger the radio-oriented optimization of the wheel monitoring in response to detection of the beginning of the driving mode.

10. A control device for a wheel monitoring system of a vehicle equipped with vehicle wheels, wherein at least one of the vehicle wheels is equipped with an electronic wheel unit, arranged thereon, for capturing at least one wheel operating parameter of the respective vehicle wheel and for transmitting radio signals, which contain information about the at least one captured wheel operating parameter, to the control device for a respective wheel rotational position of the vehicle wheel, stipulated by the electronic wheel unit, and wherein the control device is configured to receive and evaluate the radio signals,
  wherein the control device is further configured to prompt radio-oriented optimization of the wheel monitoring by receiving multiple radio signals from the electronic wheel unit and rating them in respect of their respective radio signal strength and then transmitting an optimization radio signal to the electronic wheel unit, wherein the optimization radio signal comprises optimization information formed on the basis of the rating of the multiple radio signals.

11. The control device as claimed in claim 10, wherein the control device is configured to detect beginning of a driving mode of the vehicle and to trigger the radio-oriented optimization of the wheel monitoring in response to detection of the beginning of the driving mode.

12. The control device as claimed in claim 10, wherein the control device is configured to transmit a trigger radio signal to the electronic wheel unit and trigger the radio-oriented optimization of the wheel monitoring.

13. The control device as claimed in claim 10, wherein the control device is configured to continuously rate the radio signal strength of the multiple received radio signals and to perform the radio-oriented optimization of the wheel monitoring as soon as the radio signal strength of at least one of the multiple received radio signals is below a predetermined threshold value.

14. The control device as claimed in claim 10, wherein the control device is configured to also ascertain an instantaneous loaded state of the vehicle and to perform the radio-oriented optimization of the wheel monitoring if a change in the instantaneous loaded state of the vehicle is ascertained.

15. A wheel monitoring system of a vehicle equipped with vehicle wheels, having at least one electronic wheel unit, the electronic wheel unit configured to be comprised in the wheel monitoring system of the vehicle equipped with vehicle wheels, wherein the electronic wheel unit is configured to capture, while being arranged on one of the vehicle wheels, at least one wheel operating parameter of the vehicle wheel and to transmit radio signals containing information about the at least one captured wheel operating parameter to a control device, configured to receive and evaluate the radio signals, of the vehicle for a respective wheel rotational position of the vehicle wheel, stipulated by the electronic wheel unit, wherein the electronic wheel unit is further configured to prompt radio-oriented optimization of the wheel monitoring by transmitting multiple radio signals for different wheel rotational positions of the vehicle wheel and receiving an optimization radio signal then transmitted by the control device and taking into consideration optimization information contained in said optimization radio signal for the stipulation of the wheel rotational position of the vehicle wheel for radio signals that are subsequently to be transmitted and the control device as claimed in claim 10.

16. A non-transitory computer readable medium having a program code that, when executed on a data processing device, carries out a method as claimed in claim 1.

* * * * *